Sept. 4, 1951 C. D. BENNES 2,567,005
ALIGNING STAGE FOR INSTRUMENTS
Filed Oct. 11, 1947 2 Sheets-Sheet 1
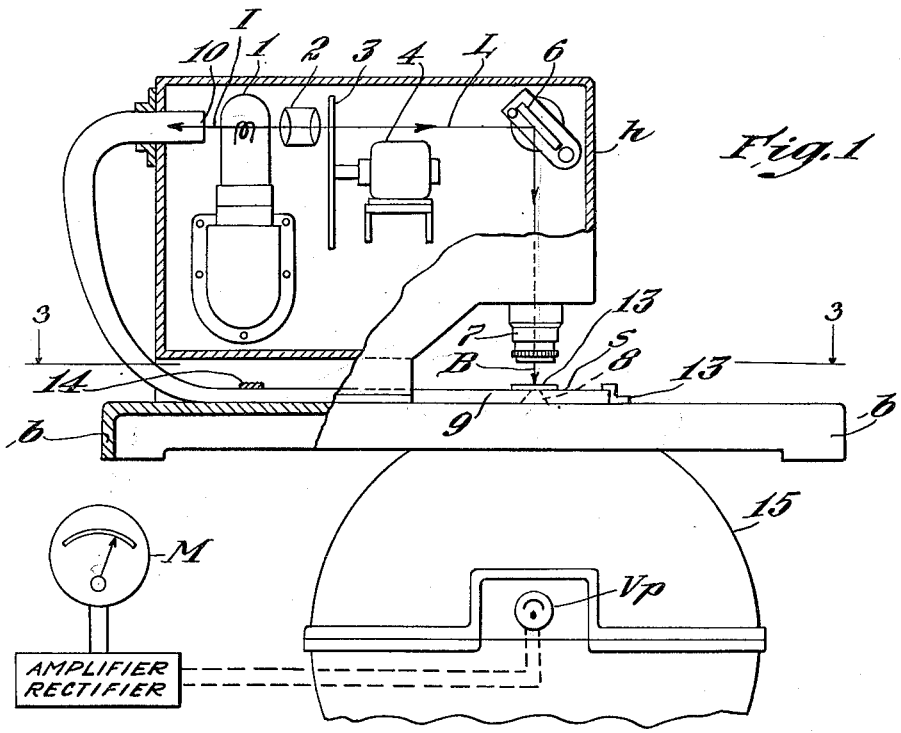
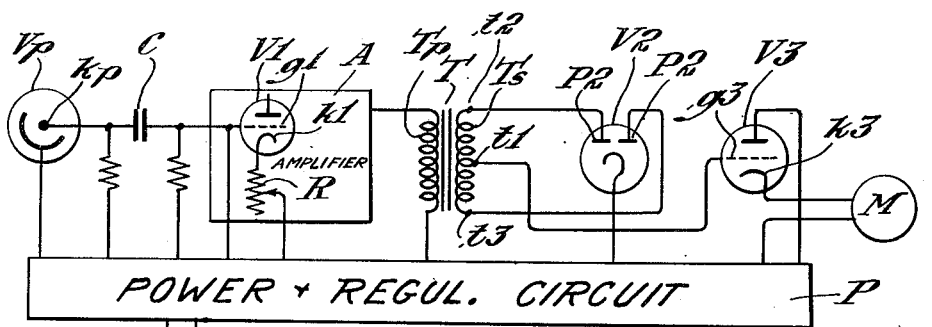
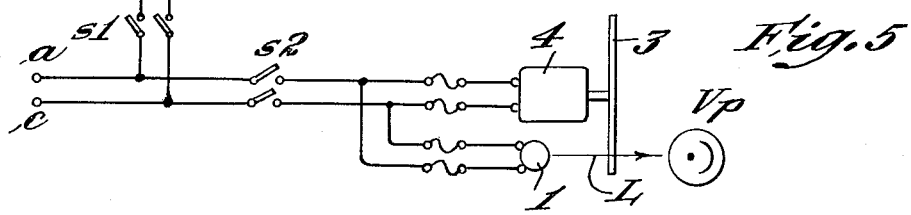
Inventor
Charles D. Bennes
by Roberts, Cushman & Grover
Att'ys.

Sept. 4, 1951  C. D. BENNES  2,567,005
ALIGNING STAGE FOR INSTRUMENTS
Filed Oct. 11, 1947  2 Sheets-Sheet 2
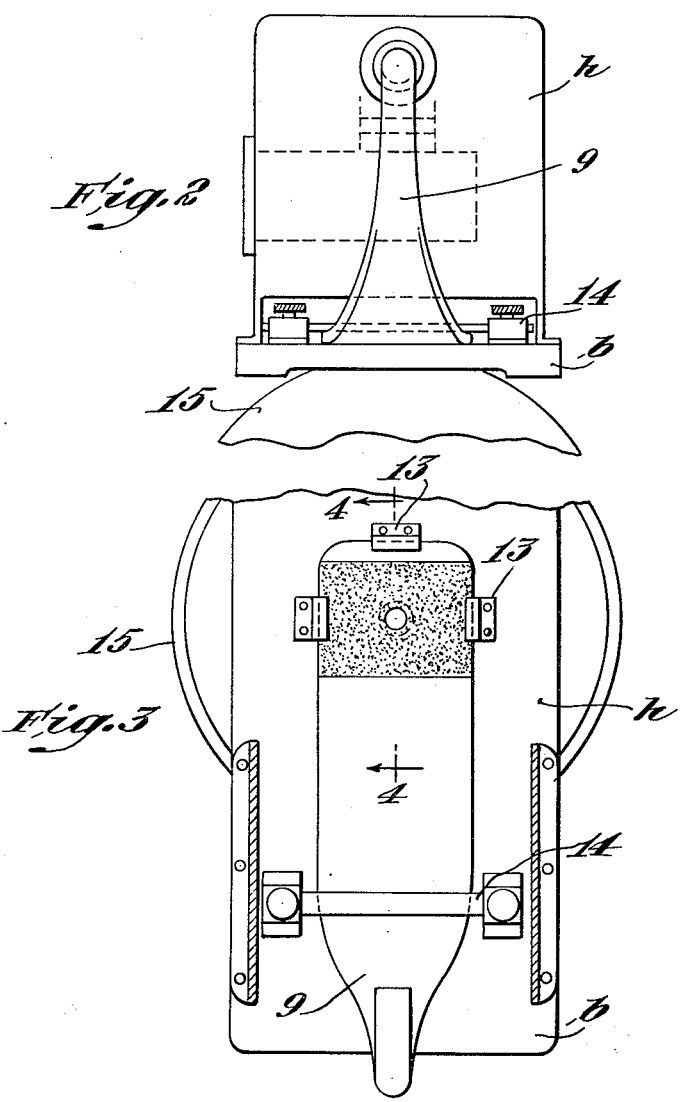
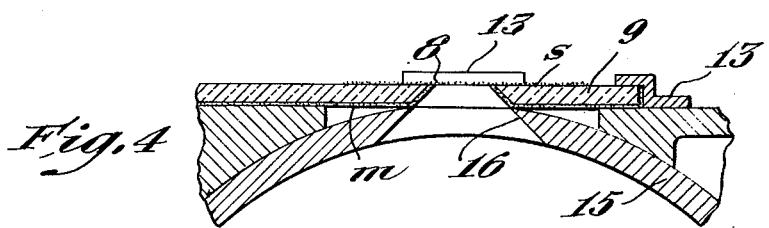
Inventor
Charles D. Bennes
by Roberts, Cushman & Grover
Att'ys.

Patented Sept. 4, 1951

2,567,005

UNITED STATES PATENT OFFICE 2,567,005

ALIGNING STAGE FOR INSTRUMENTS

Charles D. Bennes, Los Angeles, Calif., assignor to Technicolor Motion Picture Corporation, Hollywood, Calif., a corporation of Maine Application October 11, 1947, Serial No. 779,309

9 Claims. (Cl. 88—14)

It is sometimes desirable to align a measuring or testing portion, such as an aperture of an instrument or machine, with a selected portion of an object to be tested or observed, although there exists inherently no visually significant correlation between instrument and test portion of the object. For example, in motion-picture production considerable use is made of densitometers for measuring film densities for research purposes as well as in the course of standardized production procedures. As only a small spot of each film frame is to be measured, the film must be carefully and accurately placed in the densitometer. It is relatively easy to perform this operation in the visual type densitometer wherein the film is illuminated from below, the spot on the film to be measured being clearly visible. In photoelectric densitometers however the film must be in close contact with the aperture of the integrating sphere thus preventing the illumination of the film from below. This condition makes it difficult to position the film for measurement of a small area and so limits the use of such densitometers that their many advantages cannot be fully realized.

It is one of the main objects of the present invention to provide means for illuminating a test object, such as a film, so that it can be quickly and accurately positioned in testing apparatus, for example a photoelectric densitometer. Another object is to provide a densitometer which combines the advantages of both the visual and photoelectric types of densitometer, without adding to the densitometer technique any efficiency impeding operations or devices.

In its main aspect to the invention contemplates the use, in equipment requiring alignment of a testing apparatus area and a selected area of an object to be tested, of a device for indicating the selected object area, which device comprises an object support defining an effective testing apparatus area such as an aperture, a translucent body which may constitute the support and borders on the testing area and which body consists of translucent material such as polymerized methyl methacrylate, with internally reflecting surfaces, a light-issuing surface for supporting the object, a light-admitting surface portion, and a light source radiating into the admitting surface. In another aspect the invention involves the use, in conjunction with a photoelectric densitometer, of a translucent support surrounding the aperture upon which the test specimen is placed. This support has a light-admitting surface portion and a light-issuing portion adjacent to the supporting surface, and consists of a material whose index of refraction is such that when its surface is polished, light introduced into the admitting portion is reflected within the body of the support and radiated at the light-transmitting portion with very small loss of light flux regardless of the curvature or change in cross section of the body. An adjacent light source is arranged to radiate light into the support at the admitting portion thus to illuminate the area of the test specimen adjacent the issuing portion by the light transmitted through the support.

In a more specific aspect the translucent support is a rod of polymerized methyl methacrylate. One end, which surrounds the meter aperture, is flattened to form the platen or table for the test film sample. The other end is brought into the proximity of the light source of the densitometer so that light flux is transmitted through the rod to the portion adjacent to and supporting the film. This portion is roughened or sanded to allow the light to escape and illuminate the film so that it can be easily and accurately adjusted in relation to the aperture of the densitometer.

These and other objects and aspects will be apparent from the following detailed explanation illustrating the genus of the invention with reference to a concrete embodiment thereof. The description refers to the drawings in which:

Fig. 1 is a side elevation of a densitometer according to the invention with the head partly in section;

Fig. 2 is an end elevation of the densitometer according to Fig. 1;

Fig. 3 is a section on line 3—3 of Fig. 1 with the light conducting body unsectioned;

Fig. 4 is a detail enlarged cross section on line 4—4 of Fig. 3; and

Fig. 5 is a diagram of an electrical circuit incorporated in apparatus according to the invention.

Figs. 1 to 4 show a base $b$ supporting a housing $h$ wherein are suitably mounted, on conventional brackets or lens holders, an incandescent lamp 1, a condensing lens system 2, and a light chopping rotary shutter 3 driven by the synchronous motor 4. A light beam L from lamp 1 passes successively through the lens system 2 and the shutter or interrupter 3 onto mirror 6 from which it is reflected into the objective lens system 7, emerging as an intense measuring beam B. The beam B emerging from objective 7 is directed through the aperture 8 constituting a light transmitting portion or area of a film platen 9.

The platen 9 is part of a curved body of polished light-conducting material, for example polymerized methyl methacrylate, one end 10 of which, constituting a light admitting portion of the body, is in the proximity of the lamp 1. The other flattened end constitutes platen 9 containing the platen aperture 8. This flattened end is held in position on base b by clamps 13, 14. To aid in the proper illumination of a film resting on the top surface s of the platen 9, the surface is roughened or sanded and the bottom surface m coated with silver, as shown in Fig. 4.

A conventional integrating sphere 15 containing the photocell Vp is fastened to the base b with the wall of the sphere aperture 16 coinciding with and continuing at the same angle as the wall of the platen aperture 8 so that all the light passing through the apertures is integrated within the sphere.

As shown in Fig. 5, a cathode kp of a photocell Vp is coupled by means of a condenser C to the inverse feedback amplifier A which is tuned to the light beam frequency determined by the interrupter 3. The gain of amplifier A is controlled by changing the bias of the grid g1 of the first stage tube V1 by a variable resistor R in the circuit of the cathode k1. The primary winding Tp of a transformer T is connected in the output circuit of amplifier A. The secondary winding Ts is provided with a middle tap t1 which is connected to the grid g3 of an amplifier tube V3. The end taps t2, t3 of secondary winding Ts are connected with plates P2 of a rectifier tube V2. An indicating milliammeter M is in the circuit of the cathode k3 of the amplifier tube V3. Power and bias voltages for proper operation, in conventional manner, of tubes Vp, V2, V3 and amplifier A are furnished by a power and reguator circuit P, the input to which is connected across the power terminals a, c in parallel with the light interrupter motor 4 and the lamp 1 through the switches S1 and S2.

This arrangement operates as follows:
Switches S1S2 are closed, supplying power to the interrupter motor 4, the light 1, and the photocell Vp with its associated circuits P, A. To obtain a comparative reading, with no film over the aperture 8 of platen 9, the meter M is set at zero reading by varying the resistance R of the cathode circuit k1 in the first stage tube V1 of the amplifier A. The film is then placed on the film platen 9 so that the light beam B from the objective lens 7 passes through the area to be tested. The decrease in the intensity of the light beam B, after passing through film as measured by the photoelectric cell Vp, can then be read directly on meter M calibrated in terms of density.

The placing of film quickly and accurately on platen 9 so that the light beam B can be directed through a precisely selected spot on the film frame to be tested is made possible by the soft illumination of the film area surrounding the bright spot due to beam B and indicating the test aperture. This soft illumination is supplied by the light I which is admitted at the end 10 of platen 9 from light source 1 and conducted through the body until issuing from the sanded surface s of platen 9. This illumination is aided by light reflected from the silvered surface m which also serves to block stray light which would tend to enter integrating sphere 15 through aperture 16.

It will be evident that my invention can be applied to instruments other than those of the densitometer type; it is useful wherever alignment problems arise which are similar or analogous to that above discussed.

It should be understood that the present disclosure is for the purpose of illustration only and that this invention includes all modifications and equivalents which fall within the scope of the appended claims.

I claim:
1. In instrument equipment wherein alignment of a testing area illuminated by light impinging thereon with a selected portion of an object to be tested is desired, a device for illuminating said object portion, which comprises the combination of: a light source; an optical system directing said light upon a supported object to be tested; and an object support for said object of translucent material having a light transmitting portion which defines a border of said testing area and which faces said system to receive light directed by said system, a light issuing surface for supporting the object, said surface freely and unobstructedly facing said system and bordering on said transmitting portion, a light-admitting portion to receive light from said source, and internally reflecting surfaces between said light admitting portion and said light issuing surface for directing light from said admitting portion to said issuing surface.

2. Device according to claim 1 wherein said transmitting portion is an aperture of said object support and surrounded by said issuing surface.

3. Device according to claim 1 wherein said light admitting surface as well as said optical system receive light from said source.

4. Device according to claim 1 wherein said object support comprises a plate portion having an aperture constituting said transmitting portion surrounded by a flat surface of the plate portion constituting said issuing surface.

5. Device according to claim 1 wherein said issuing surface is roughened and said plate portion has opposite said issuing surface a reflecting surface for directing light to the issuing surface.

6. Device according to claim 1 wherein said aperture has a reflecting edge portion which is inclined to direct light to said issuing surface.

7. In light measuring equipment wherein alignment of a testing area illuminated by light impinging thereon with a selected portion of an object to be tested is desired, the combination of: a light source; an object support of translucent material having a light-transmitting portion which defines a border of said testing area, a free and unobstructed light issuing surface for contacting and positioning the object, said surface bordering on said transmitting portion, a light-admitting portion receiving light from said source, and internally reflecting surfaces between said light admitting portion and said light issuing surface for directing light from said admitting portion to said issuing surface; and an optical system furnishing said testing light mounted on one side of said support for illumination of said transmitting portion.

8. Equipment according to claim 7 wherein said object support has a flat part forming said transmitting portion and said issuing surface and a rod shaped part ending in said admitting portion adjacent said source and wherein said optical system is arranged likewise to receive light from said source.

9. In instrument equipment wherein alignment of a testing area illuminated by light impinging thereon with a selected portion of an object to be tested is desired, a device for illuminating said object portion, which comprises the combination of: a light source; an optical system directing said light from said source upon a supported object to be tested; and an object support for said object of translucent material having a flat part with an aperture therein which defines said testing area and which is surrounded by a flat roughened portion constituting a free and unobstructed light issuing surface for supporting the object, and a rod shaped light conducting portion leading to said source and having a light-admitting portion adjacent said source.

CHARLES D. BENNES.

REFERENCES CITED

The following references are of record in the file of this patent:

UNITED STATES PATENTS

| Number | Name | Date |
| --- | --- | --- |
| 336,257 | Palmer | Feb. 16, 1886 |
| 1,461,367 | Ott et al. | Feb. 10, 1923 |
| 2,026,675 | Edwards | Jan. 7, 1936 |
| 2,146,506 | Maisch | Feb. 7, 1939 |
| 2,185,252 | Kellog et al. | Jan. 2, 1940 |
| 2,221,152 | Rylsky | Nov. 12, 1940 |
| 2,282,045 | Fleischer | Mar. 5, 1942 |
| 2,286,737 | Hills | June 16, 1942 |
| 2,373,104 | Dieffenbach | Apr. 10, 1945 |

FOREIGN PATENTS

| Number | Country | Date |
| --- | --- | --- |
| 194,418 | Germany | Jan. 22, 1908 |